United States Patent [19]

Greene

[11] 3,749,424
[45] July 31, 1973

[54] WATER CONDUIT CONNECTOR
[75] Inventor: Nat Greene, Los Angeles, Calif.
[73] Assignee: KDI American Products, Inc., Los Angeles, Calif.
[22] Filed: June 5, 1972
[21] Appl. No.: 259,482

[52] U.S. Cl.................... 285/161, 4/172, 285/200
[51] Int. Cl............................................. F16l 41/00
[58] Field of Search.................. 285/161, 200, 208, 285/209, 210, 206; 4/172, 172.19

[56] References Cited
UNITED STATES PATENTS

| 2,344,056 | 3/1944 | Pepersack | 285/200 X |
| 2,667,369 | 1/1954 | Harper | 285/200 X |
| 2,500,531 | 3/1950 | Eger | 285/200 X |
| 537,031 | 4/1895 | Gompper | 285/206 |
| 1,037,200 | 9/1912 | Brinkerhoff | 285/206 |

FOREIGN PATENTS OR APPLICATIONS

| 566,954 | 1/1945 | Great Britain | 285/200 |
| 594,881 | 3/1934 | Germany | 285/200 |
| 926,784 | 4/1947 | France | 285/200 |

Primary Examiner—Thomas F. Callaghan
Attorney—Robert E. Geauque

[57] ABSTRACT

A water conduit connector which is particularly adapted to connect a water conduit to the wall of a swimming pool in a water-tight manner, the swimming pool being formed of an outer rigid sheet material layer and an interior plastic water-tight layer, the connector including a cylindrical tubular member extending through an opening through both of the interior layer and the outer layer, an annular collar extending from the tubular member and located between the interior layer and the outer layer, a washer to surround the tubular member and adapted to come into contact with the interior layer and frictionally bind such to the annular collar, the washer including a plurality of spaced apart radial ridges to resist rotational movement between the washer and the interior layer, a lock nut to be engaged with the tubular member and be in contact with the washer, the lock nut including a plurality of concentrically disposed rings which are to contact the washer and upon such being tightened, a minimal amount of torque is created tending to rotate the washer.

8 Claims, 5 Drawing Figures

PATENTED JUL 31 1973 3,749,424

WATER CONDUIT CONNECTOR

BACKGROUND OF THE INVENTION

The field of this invention relates to a connector for water conduits and more particularly to a connector for a thin walled sheet material type of swimming pool which employs an inner flexible plastic liner.

It is becoming quite common to construct swimming pools of a sheet metal outer layer and an interior layer of flexible water-tight plastic. It is not at all unusual to locate such swimming pools beneath the ground. Such flexible walled swimming pools employ water inlets and outlets which pass through the wall of the pool adjacent the bottom of the pool. This means that the water conduits are buried within the ground. During the time the pool is constructed, a connector is installed through the wall of the pool and is attached to the water conduit. The function of the connector is to establish a water-tight connection with the water conduit and also prevent water from leaking exteriorly of the pool through the opening formed in the wall of the pool.

It is quite common that after a two or three year period, the flexible plastic inner liner of the pool is replaced. Previous types of conduit connectors cooperated in a screw threading manner with the water conduit and could be readily removed when it is desired to replace the liner. However, such disturbing of the connection between the conduit and the connector in a buried pipe line causes dirt and other foreign material to fall within the pipe conduit and may readily disturb the screw threaded connection. Additionally, if the connector becomes damaged or a leakage between the connector and the conduit developed, it would be necessary to dig into the ground to effect a replacement or repair.

It would be desirable to design a water conduit connector for use in a flexible walled swimming pool which eliminates the above noted difficulties.

SUMMARY OF THE INVENTION

The water conduit connector of this invention employs the use of a tubular member which is to be permanently attached to a water conduit. The tubular member includes an enlarged annular collar located about the tubular member. The tubular member is to extend through openings formed in the sheet material wall of the pool and an opening formed through the liner of the pool. The inner surface of the enlarged collar is to be in contact with the sheet material wall. The clamp ring is to cooperate with the tubular member and is to be tightened down against the opposite side of the sheet material wall thereby effecting a secure retention of the tubular member with respect to the sheet material wall. The flexible liner is to come into contact with the other side of the enlarged collar with this side of the enlarged collar being substantially smooth. A washer is to extend over the tubular member and come into contact with the liner. The washer includes a plurality of spaced apart radially extending ridges. A lock nut is to cooperate with the tubular member and is to be tightenable against the washer. The portion of the lock nut which is to come into contact with the washer includes a plurality of spaced apart concentric ridges. During the tightening action of the lock nut, the radially located ridges upon the washer and the concentric ridges located upon the lock nut cooperate together to resist rotational movement of the washer with respect to the liner which could tear the liner.

DETAILED DESCRIPTION OF THE SHOWN EMBODIMENT

Figure 1:
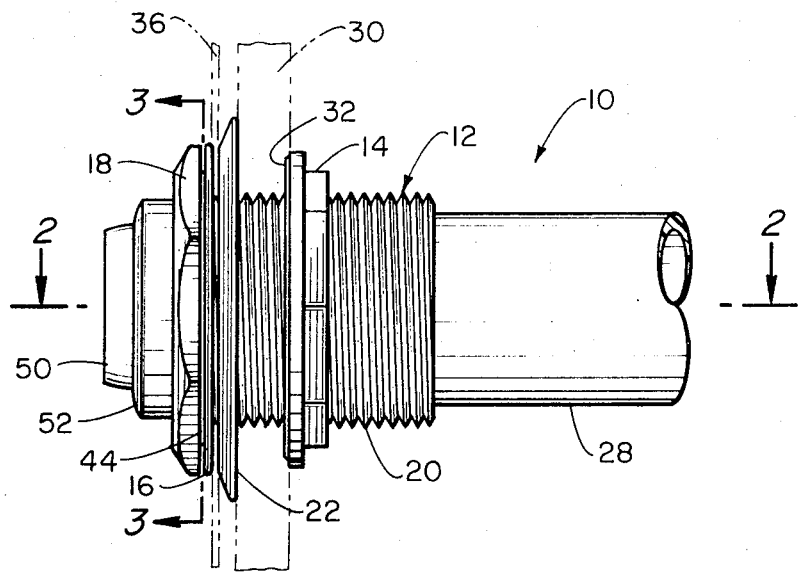
FIG. 1 is a longitudinal view of the connector of this invention.

Referring particularly to the drawing, there is shown in FIG. 1 the connector 10 of this invention which basically includes a cylindrical tubular body 12, a clamp ring 14, a washer 16 and entire lock nut 18. The body 12 includes screw threads 20 formed along its entire exterior surface. Located intermediate the end of the body 12 is located an annular enlarged collar 22 which is formed integral with the body 12 and extending outwardly therefrom. The body 12 also includes an interior longitudinal opening which is divided into a smooth walled section 24 and a threaded section 26.

Figure 2:
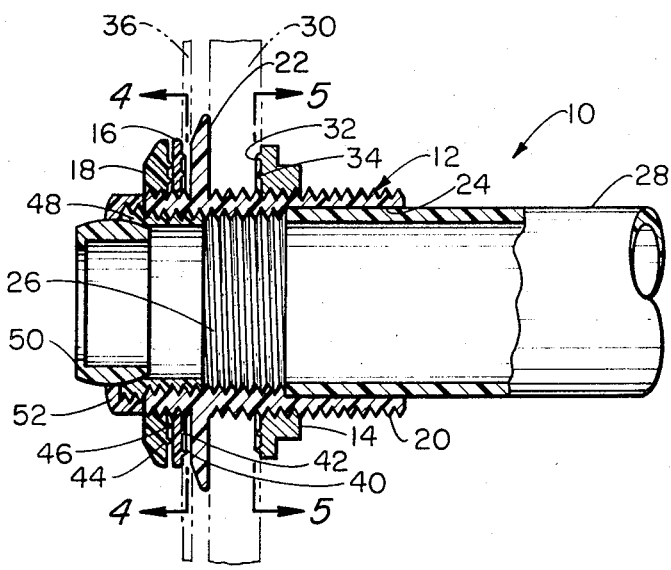
FIG. 2 is a cross-sectional view of the connector of this invention taken along line 2—2 of FIG. 1.
Figure 3:
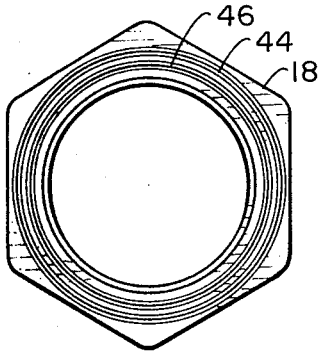
FIG. 3 is a view of the lock nut taken along line 3—3 of FIG. 1.
Figure 4:
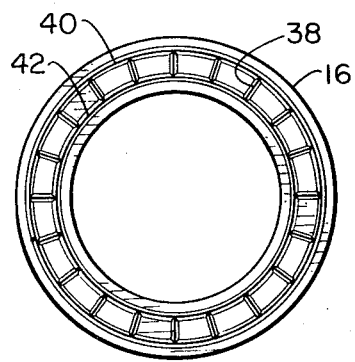
FIG. 4 is a view of the washer employed within this invention taken along line 4—4 of FIG. 2.
Figure 5:
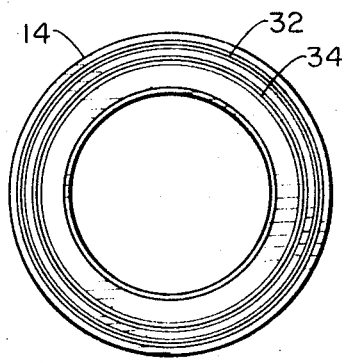
FIG. 5 is a view of the clamp ring employed within this invention taken along line 5—5 of FIG. 2.

A water conduit 28 may be permanently affixed within the smooth wall section 24 by means of an adhesive such as shown in FIG. 2 of the drawings. Also, the threadably threaded section 26 could be employed, if desired, to threadedly secure the body 12 to the conduit 28. It is normally desired that the adhesive securing of the conduit 28 to the body 12 be employed as the chances of leakage are remote over a period of time about an adhesive connection.

One side of the collar 22 is to be located in physical contact with the sheet metal wall 30 of a swimming pool. It is to be understood that the normal material construction of the wall 30 will be metal. However, this invention is not to be limited thereto.

Clamp ring 14 is to be the clamp threaded upon the body 12. The surface of the clamp ring 14 which is to come into contact with the wall 30 includes a pair of concentrically spaced apart ridges 32 and 34. The ridges 32 and 34 provide a minimum area in contact with the wall 30 and therefore facilitates the application of torque to the clamp ring 14 with an extremely strong clamping force between the clamp 14 and the enlarged collar 22 resulting.

The flexilbe liner 36 of the pool is to be located upon the opposite side of the enlarged collar 22. The surface of the collar 22 which is to come into contact with the liner 36 is to normally be substantially smooth.

The washer 16 is to be capable of readily passing over the body 12 and is to come into contact with the liner 36. The surface of the washer 16 which is to come into contact with the radial 36 includes a plurality of equidistantly spaced apart radial ridges 38. A pair of concentric ridges 40 and 42 are located on each side of the radial ridges 38.

The lock nut 18 is the lock threadingly cooperate with the body 12. The surface of the lock nut 18 which is to come into contact with the outer smooth surface of the washer 16 also includes a plurality of concentrically disposed spaced apart ridges 44 and 46. The function of the ridges 44 and 46 is substantially identical to that of the ridges 32 and 34.

Normally it is desired that some form of nozzle cooperate with the connector so as to vary the direction of flow of the water into the pool. An example of such a nozzle is shown wherein the nozzle includes a main body 48 which is threadingly connected to the threads 26. This main body 48 includes an interior spherical surface formed therein which is to facilitate cooperation with a movable nozzle element 50. A clmaping member 52 is to be located about both of the elements 50 and threadingly cooperating with an exterior threaded section upon the body 48. The clamping member 52 permits the nozzle element 50 to be fixedly positioned in a particular location.

In order to install the connector 10 of this invention within a swimming pool, it is presumed that the swimming pool has been located beneath the ground and the rigid wall 30 is located in place and the water conduit 28 is located adjacent the wall. The person then places the tubular body 12 through an appropriate opening in the wall 30 and affixes such either by threads or by adhesive to the water conduit 28. This affixing should be such so that the collar 22 is located directly adjacent one surface of the wall 30. The clamp ring 14 is then tightened against the opposite side of the wall 30 resulting in a clamping of the body 12 between the wall 30 and the conduit 28.

The flexible liner 36 is then located adjacent the free side of the collar 22. The washer 16 is then placed in contact with the liner 16 with the radial ridges and the concentric ridges formed thereon being in direct contact with the liner 36. The lock nut 18 is then threaded upon the tubular body 12 and tightened against the washer 16. Because of the ridges 44 and 46 upon the lock nut 18, a minimum amount of area of the lock nut comes into contact with the washer 16. Because of the arrangement of the concentric ridges upon the lock nut 18 and the radial ridges upon the washer 16, a minimum amount of torque is created which tends to rotate the washer 16 with respect to the liner of the pool. Therefore, the chances of tearing the liner during the tightening procedure are quite remote.

What is claimed as new in support of Letters Patent is:

1. In combination with the wall of a swimming pool, said wall being constructed of a rigid outer sheet material layer and an interior flexible water-tight layer, an opening extending through said outer layer and said interior layer, a water conduit located adjacent said opening, a water conduit connector comprising:
  a tubular member to connect with said water conduit and extend entirely through said opening, said tubular member having a first means located between said outer sheet material layer and said interior water-tight layer;
  a washer surrounding said tubular member having an interior surface and an exterior surface, said interior surface to contact said interior layer, said interior surface having second means thereon for resisting rotational movement relative to said interior layer; and
  a lock nut surrounding and engaging said tubular member, said lock nut including a third means to contact said washer and be capable of forcing said washer into frictional contact with said interior layer.

2. The combination as defined within claim 1 wherein:
  said tubular member being cylindrical in configuration, said first means comprises an enlarged annular collar extending radially outward from said tubular member.

3. The combination as defined within claim 2 wherein:
  the surface of said collar which is in contact with said interior water-tight layer being substantially smooth in configuration.

4. The combination as defined within claim 3 including:
  said tubular member being externally threaded, a clamp ring to engage said threaded tubular member, said clamp ring having an engaging surface to contact said rigid outer sheet material layer and effect clamping of said outer sheet material layer between said collar and said clamp ring, said engaging surface of said clamp ring including a plurality of spaced apart concentric ridges, whereby said clamp ring upon being forced into frictional engagement with said outer layer a minimum amount of torque is created which tends to result in rotation of said tubular member relative to said outer layer.

5. The combination of claim 4 wherein:
  said tubular member being fixedly secured in a permanent manner to said water conduit.

6. The combination as defined in claim 3 wherein:
  said second means omprises a plurality of radial, spaced apart ridges, whereby said ridges tend to frictionally bind said flexible water-tight layer to said smooth surface of said collar, thereby tending to resist rotational movement of said washer relative to said flexible water-tight layer.

7. The combination as defined in claim 6 wherein:
  said radial ridges being located between a plurality of concentrically located ridges.

8. The combination as defined in claim 7 wherein:
  said third means comprises a plurality of concentrically located ridges.

* * * * *